United States Patent [19]

MacDonald

[11] 3,731,546
[45] May 8, 1973

[54] POWER OPERABLE PIVOT JOINT

[75] Inventor: J. G. Fraser MacDonald, Rockford, Ill.

[73] Assignee: Sundstrand Corporation, Rockford, Ill.

[22] Filed: Dec. 1, 1971

[21] Appl. No.: 203,532

[52] U.S. Cl. .................. 74/63, 74/89.15, 74/424.8, 74/57, 244/87
[51] Int. Cl. ............................................. F16h 21/12
[58] Field of Search .................... 74/89.15, 424.8, 74/57, 63, 801; 244/87; 92/31

[56] References Cited

UNITED STATES PATENTS

| | | | |
|---|---|---|---|
| 2,082,433 | 6/1937 | Whitcomb | 74/63 |
| 2,744,698 | 5/1956 | Baynes | 244/87 |
| 3,292,499 | 12/1966 | Duffy | 74/57 |
| 3,421,383 | 1/1969 | Smith et al. | 74/424.8 R |
| 3,668,940 | 6/1972 | Avens | 74/57 |
| 3,008,355 | 11/1961 | Grudin | 74/801 |
| 3,133,476 | 5/1964 | Geyer | 92/31 |

Primary Examiner—Charles J. Myhre
Assistant Examiner—Wesley S. Ratliff, Jr.
Attorney—Hofgren, Wegner, Allen, Stellman & McCord

[57] ABSTRACT

A power operable pivot joint for mounting and actuating a trailing edge flap or the like on an airplane wing, including a pair of laterally spaced bearing rings having outwardly projecting support arms adapted to be secured to an airplane wing, an annular member pivotally mounted on the bearing rings for movement about a pivot axis and having a outwardly projecting arm adapted to be attached to a wing flap, a set of angularly spaced keys disposed in the bearing rings and secured thereto, a set of angularly spaced keys disposed in the pivoted member and secured thereto, an actuator disposed in the bearing rings and pivoted member and having angularly spaced guide grooves respectively cooperating with said keys, one of the sets of keys and cooperating grooves being helical about the pivot axis so that axial movement of the actuator causes pivotal movement of the pivoted member, housing means secured to the bearing rings and enclosing the actuator, and means mounted in the housing and connected for moving the actuator axially of the pivot axis. In one embodiment, a screw shaft is mounted in the housing means against bearings for absorbing the axial thrust of the shaft, and the actuator is threadably mounted on the shaft for movement of the actuator on rotation of the shaft. In another embodiment, the housing includes means defining expansible fluid chambers at opposite ends of the actuator for receiving fluid under pressure to move the actuator back and forth. In another embodiment, there are dual actuators controlled by oppositely threaded portions on a single screw shaft. An important aspect of each construction resides in the utilization of angularly spaced keys and cooperating grooves at the outer surface of the actuator, all having the same pitch radius about the pivot axis for even distribution of the loads.

31 Claims, 12 Drawing Figures

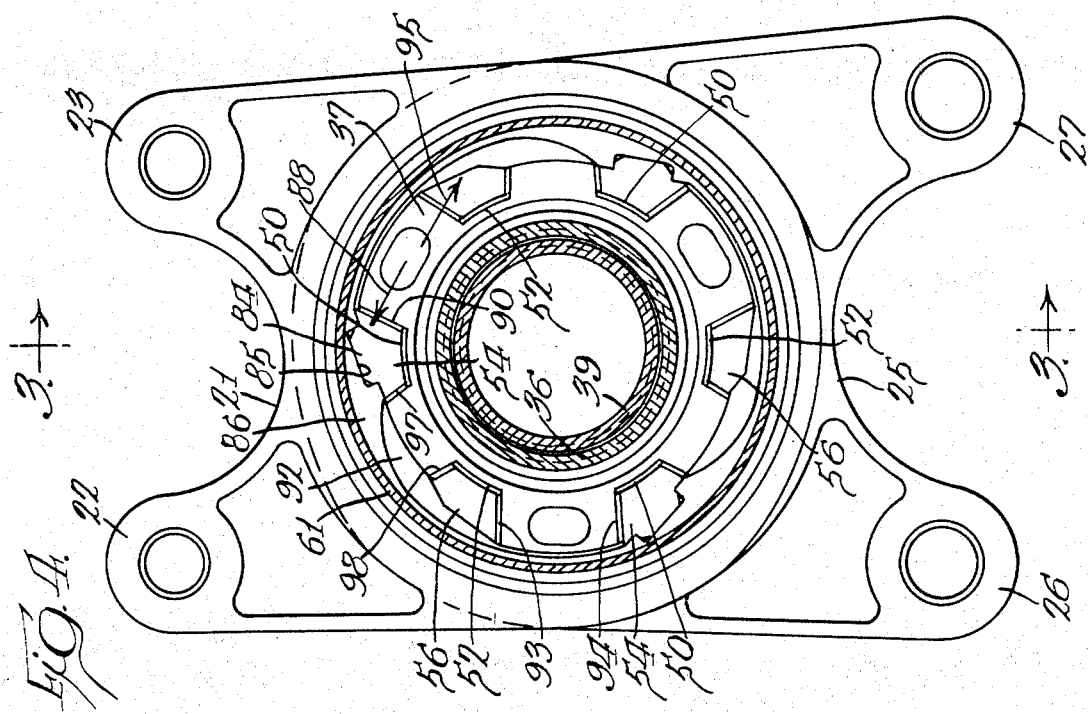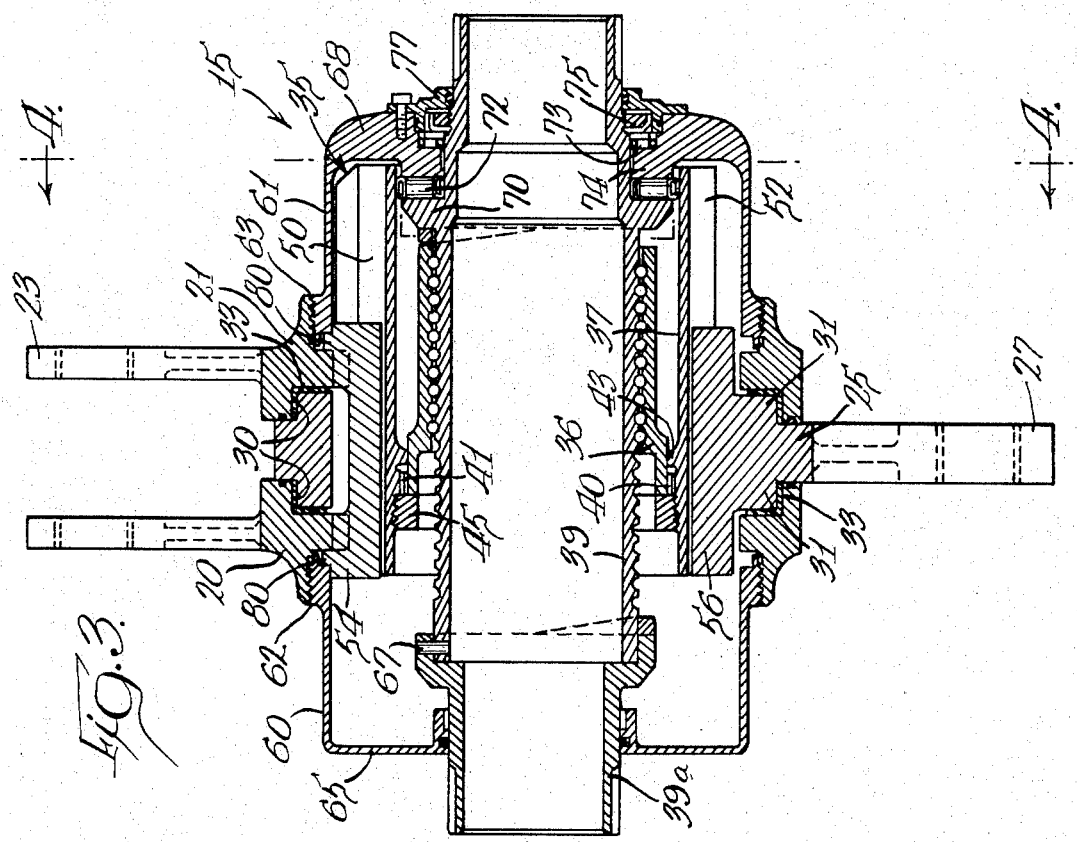

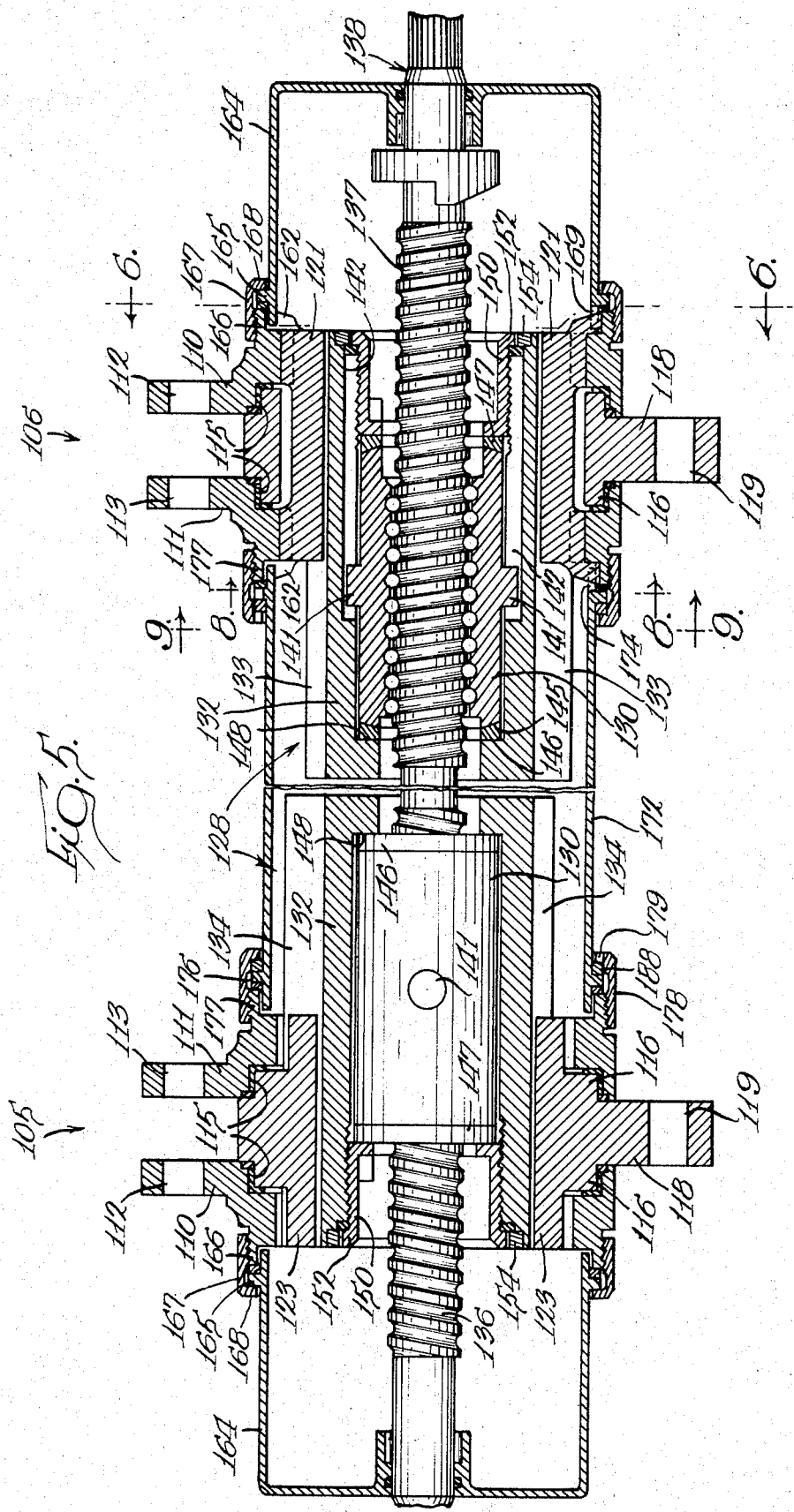

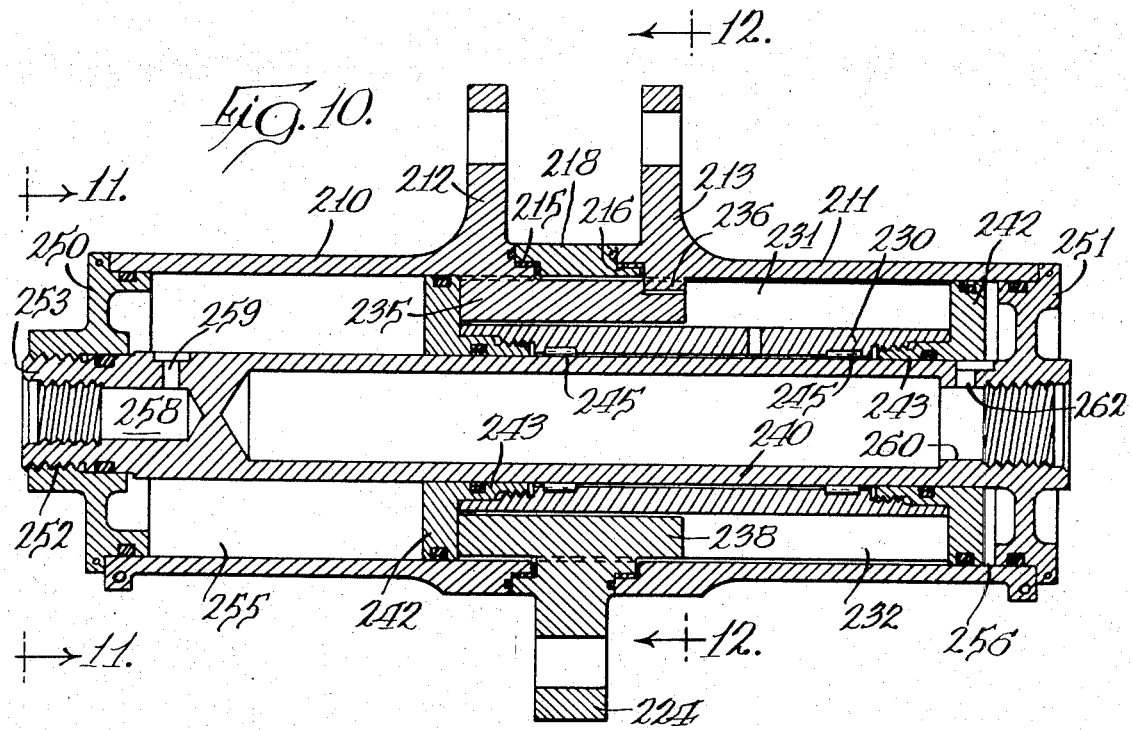
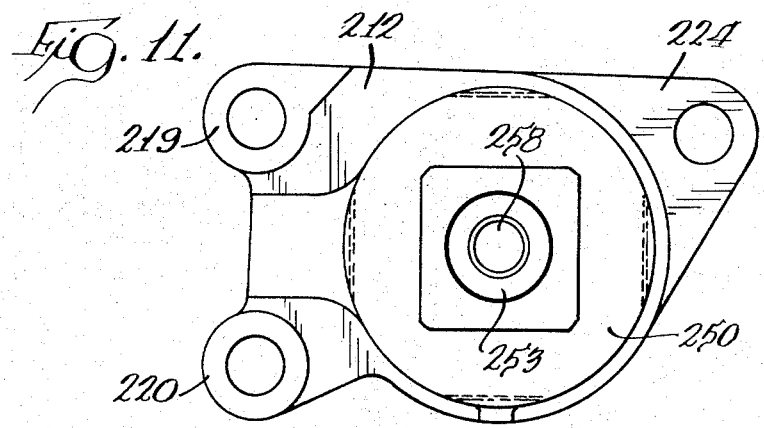
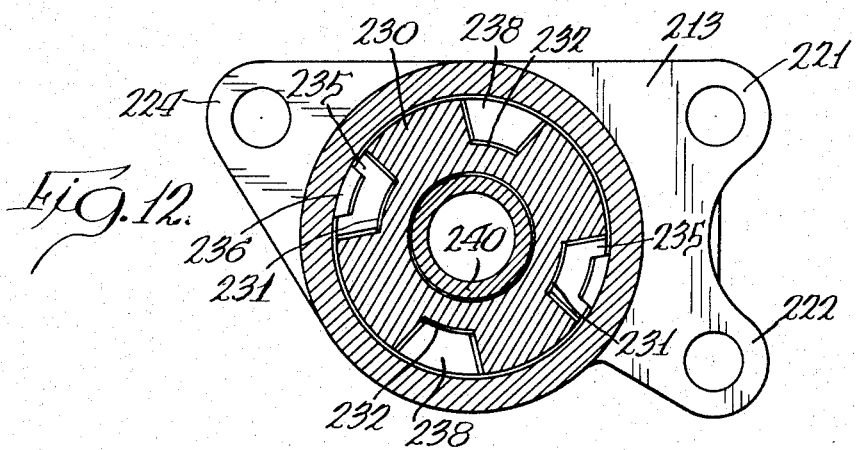

POWER OPERABLE PIVOT JOINT

BACKGROUND OF THE INVENTION

The present invention relates to an apparatus which has sometimes been referred to as an "actuator" and which has the capacity for pivotally mounting and pivotally actuating a pivoted structure which is subjected to high torque loads and also to high shear loads. The apparatus is particularly useful in connection with the mounting and actuation of trailing edge flaps in airplane wings. In the past, wing flaps have been actuated by geared rotary actuators such as that disclosed in U.S. Pat. No. 3,008,355 which utilizes planetary gearing. Generally speaking, such prior art devices provide for adequate angular pivotal movement of the wing flap, but they require a relatively large over-all outer diameter in order to provide for adequate gearing to handle the loads involved. Also, loads in such devices are limited by maximum gear tooth strength, and increase in load capacity requires increase in over-all diameter.

The present invention provides an improved power operable pivot joint which utilizes a longitudinally movable actuator having a generally cylindrical outer surface formed with longitudinally extending cam grooves cooperating with keys of substantial size capable of transmitting high loads in an arrangement which has a relatively small over-all outer diameter. In one form of the device, the input is through a rotary screw shaft which moves the actuator longitudinally to produce a camming action which provides pivotal motion of the output member while the actuator reacts against the housing. In another form of the device, hydraulic fluid under pressure is utilized to move the actuator back and forth.

There are some pertinent prior art devices. For example, U.S. Pat. No. 3,133,476 relates to a rotary actuator in which a rotatable input shaft has a threadable connection for moving an actuator longitudinally to react against a housing for producing rotary motion of an output member. However, in such patented device, the reaction means on the actuator for cooperating with the housing and the output member are not coextensive on a common pitch diameter. Additionally, at page 131 in the Feb. 6, 1969, issue of Machine Design, there is an advertisement of a powered hinge utilizing hydraulic fluid for moving an actuator back and forth to produce a camming action which pivots the output member while the actuator reacts against the housing. However, in the advertisement, the reaction means on the actuator for cooperating with the housing and the output member are not both on the outer surface of the actuator at a common pitch diameter.

SUMMARY OF THE PRESENT INVENTION

The present invention relates to a power operable pivot joint of the type described including a longitudinally movable actuator formed with angularly spaced cam means reacting against a housing and acting against an output member to pivot the latter on longitudinal movement of the actuator, in an arrangement where both cam means are formed on the outer periphery of the actuator at the same pitch diameter in order to provide for high load capacity with reduced stress concentration and relatively small over-all outside diameter.

In the preferred constructions illustrated, the cam means comprises cam grooves on the outer generally cylindrical surface of the longitudinally movable actuator, cooperating with keys on the housing and the pivoted output member, and at least one of the cooperating cam groove and key is inclined relative to the pivot axis of the output member so that longitudinal movement of the actuator effects pivotal movement of the output member.

As illustrated herein, the cooperating cam means on the actuator and the support means is disposed helically relative to the pivot axis of the output member, and the cooperating cam means on the actuator and the output member is disposed parallel to the pivot axis.

In one embodiment, a screw shaft is rotatable in the housing and has a threaded connection with the actuator for moving the latter longitudinally on rotation of the shaft.

In another embodiment, means is provided in the housing defining expansible fluid chambers at opposite ends of the actuator for receiving fluid under pressure to move the actuator back and forth.

In a screw actuated device, the housing includes relatively large thrust bearings for absorbing thrust of the screw shaft in one direction, and relatively small thrust bearings for absorbing thrust in the opposite direction.

In an arrangement specifically adapted for actuating flaps on an aircraft wing, the housing comprises a pair of laterally spaced bearing rings rigidly secured together and having outwardly projecting support arms adapted to be secured to the airplane wing, an annular member pivotally mounted on the bearing rings and having an outwardly projecting arm adapted to be attached to the wing flap, and cover members secured to the bearing rings and enclosing the actuator.

In a two-stage embodiment, a pair of actuators are threadably mounted on oppositely threaded portions of a screw shaft, and each actuator comprises an inner tubular member threadably connected with the screw shaft, and an outer sleeve secured to the tubular member for longitudinal movement therewith and having reaction means cooperating with the housing and the pivoted output member, together with means mounting the inner tubular member for pivotal movement relative to the associated outer sleeve to accommodate bending of the housing relative to the screw shaft.

BRIEF DESCRIPTION OF THE DRAWINGS

FIG. 3 is a longitudinal sectional view through a pivot joint of the type illustrated in FIGS. 1 and 2;

FIG. 4 is a transverse sectional view taken at about the line 4—4 of FIG. 3;

FIG. 5 is a longitudinal sectional view through a two-stage pivot joint, taken along the line about like that shown at 5—5 in FIG. 6, which is disposed to indicate that the sectional view at the left end of FIG. 5 is taken on a line at an angle approximately 90° to the line at which the sectional view is taken at the right end of FIG. 5;

FIG. 10 is a longitudinal sectional view through a single stage hydraulically operated pivot joint;

FIG. 11 is an end elevational view at about the line 11—11 of FIG. 10; and

FIG. 12 is a transverse sectional view taken at about the line 12—12 of FIG. 10.

DETAILED DESCRIPTION OF THE EMBODIMENT OF FIGS. 1-4

Figure 1:
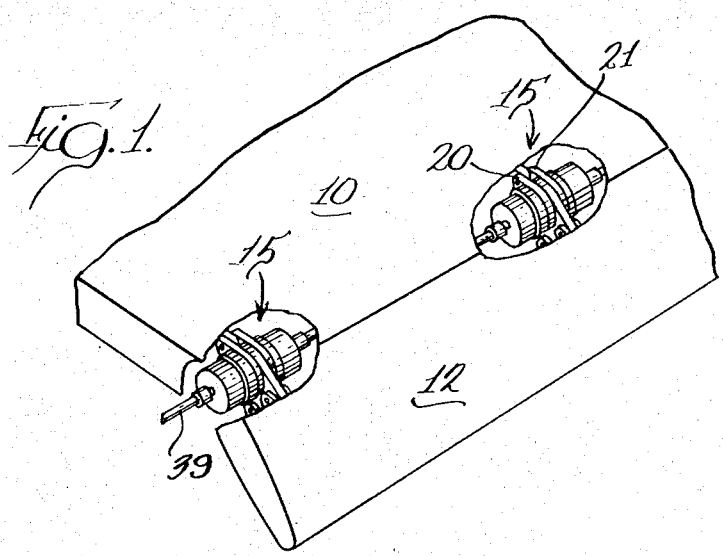
FIG. 1 is a fragmentary perspective view of an aircraft wing with a trailing flap, partly broken away to show power operable pivot joints embodying the principles of the present invention.

Referring now to FIG. 1, an aircraft wing 10 has a trailing edge flap 12 pivotally mounted and pivotally actuated by means of an apparatus 15 which has been referred to as a powered hinge, and as a rotary actuator, and which is referred to herein as a power operable pivot joint.

Figure 2:
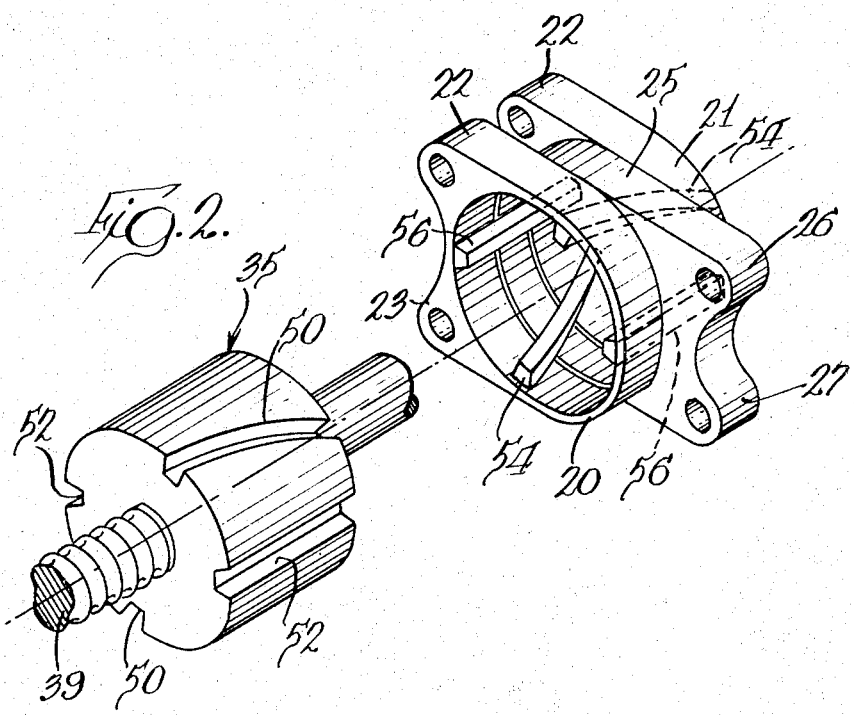
FIG. 2 is an exploded diagrammatic illustration of pivot joints of the type illustrated in FIG. 1.
Figure 6:
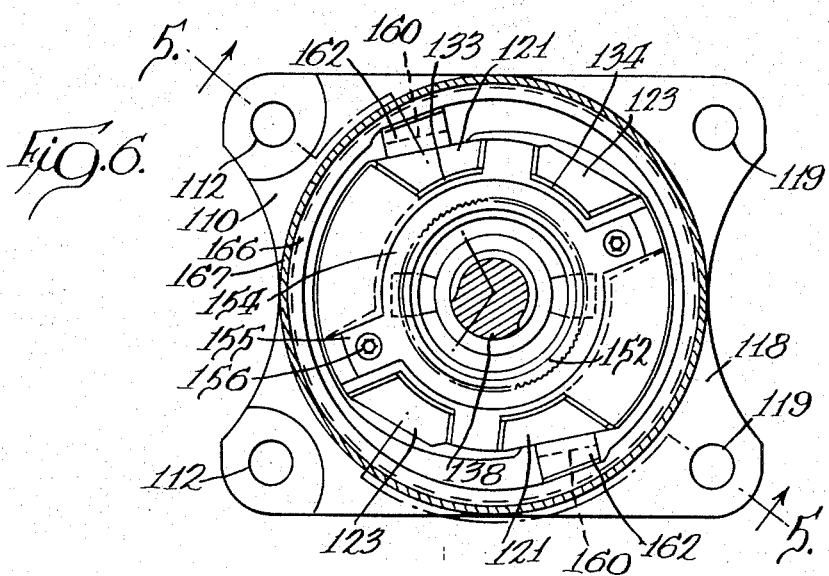
FIG. 6 is a transverse cross sectional view taken at about the line 6—6 of FIG. 5.
Figure 7:
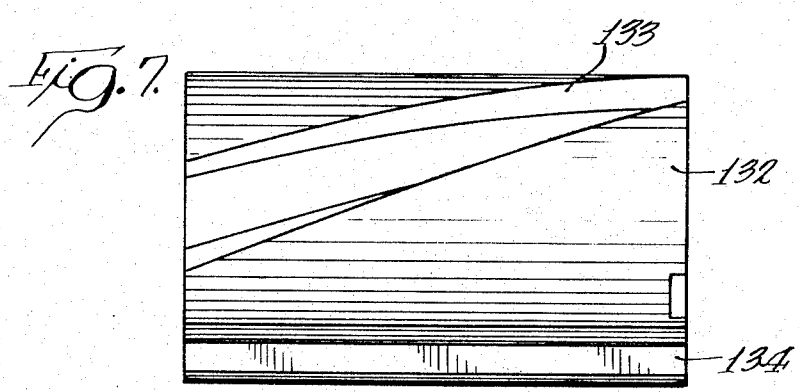
FIG. 7 is an outer plan view of the longitudinally movable actuator shown in FIGS. 5 and 6.
Figure 8:
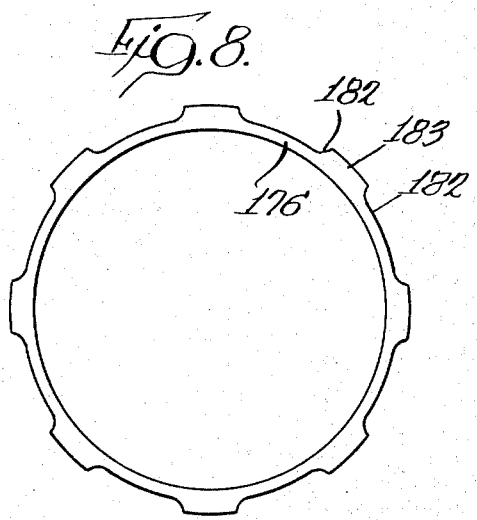
FIG. 8 is a transverse sectional view at about the line 8—8 of FIG. 5.
Figure 9:
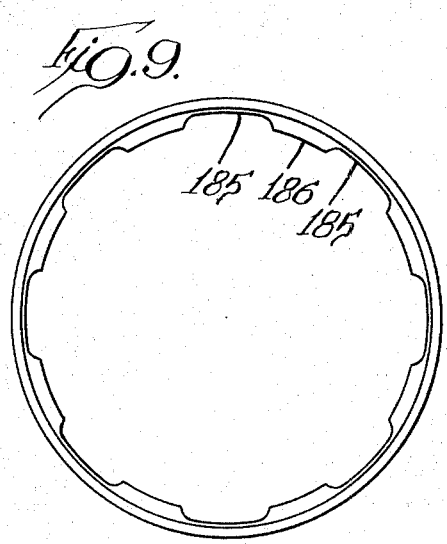
FIG. 9 is a transverse sectional view taken at about the line 9—9 of FIG. 5.

FIGS. 2, 3, and 4 illustrate the detailed construction of a power operable pivot joint utilizing a rotary screw shaft input. A pair of annular bearing rings as at 20 and 21 are each formed with a pair of outwardly projecting ears or arms as at 22 and 23. The ears 22 and 23 include apertures for mounting the bearing rings 20 and 21 stationarily on the wing structure 10. The rings 20 and 21 are mounted in laterally spaced positions at opposite sides of a pivotal output member 25 having outwardly projecting ears or arms as at 26 and 27. The ears 26 and 27 have apertures for appropriately mounting the output member 25 on the wing flap 12. In order to pivotally mount the output member 25, each of the annular bearing rings 20 and 21 is formed with an internal annular bearing recess as at 30, and the output member 25 is formed with external bearing shoulders as at 31 positionable in the recesses 30. Preferably, the bearing recesses 30 are covered with suitable bearing material as indicated at 33.

In order to effect pivotal movement of the output member 25, an actuator 35 is moved longitudinally while reacting against the stationary bearing rings 20 and 21 to cam the output member in an angular direction about the axis of the bearings 30. The actuator 35 is tubular, and as illustrated, it comprises an inner tubular member as at 36, and an outer sleeve as at 37 secured on the inner member. The inner tubular member 36 has an internally threaded portion having a threaded connection with an externally threaded portion on a rotary input shaft 39, preferably through the medium of a ball screw joint. The inner tubular member 36 has an enlarged end portion with an external spline as at 40 engaged with an internal spline 41 on the outer sleeve member 37 so that the two members rotate together. The end of the splines 40 on the inner tubular member 36 engage an internal shoulder 43 on the sleeve 37, and the sleeve 37 is internally threaded to receive a locking ring as at 45, which is screwed up tight against the end of the inner member 36 to lock the member 36 for longitudinal movement with the outer sleeve member 37.

The outer sleeve 37 has a generally cylindrical outer surface which is formed with longitudinally extending cam grooves adapted for cooperation with interfitting keys on the stationary bearing rings 20 and 21 and on the pivotal output member 25. In the diagrammatic illustration of FIG. 2 provided for purposes of indicating the principles of operation, the actuator is provided on the outer surface with two helically disposed grooves as at 50 and two straight grooves as at 52. The helical grooves 50 cooperate with a pair of helically disposed keys as at 54 secured to the stationary bearing rings 20 and 21, while the grooves 52 cooperate with a pair of straight keys as at 56 on the pivotal output member 25.

Referring briefly to FIG. 2 for an understanding of the principles of operation, assuming the rotary input shaft 39 is restrained against axial movement, rotation of the shaft will have the effect of moving the actuator 35 longitudingally relative to the shaft. With the stationary helical keys 54 in the helical grooves 50, such longitudinal motion of the actuator 35 will result in rotation of the actuator. With the straight keys 56 in the straight grooves 52, such rotation of the actuator 35 has the effect of pivoting the output member 25 about the pivot axis which is coincident with the axis of the input shaft 39.

Referring to FIGS. 3 and 4, the stationary structure secured to the wing 10 includes a housing formed by means of a pair of end covers 60 and 61 which have inner ends externally threaded for connection respectively with the stationary bearings rings 20 and 21 as indicated at 62 and 63. Outer ends of the housing members 60 and 61 are formed with appropriate apertures for mounting the rotary input shaft 39. In particular, the housing member 60 has a closed end portion 65 for rotatably mounting shaft end portion 39a which is formed separately to permit appropriate assembly, and pinned to the screw shaft 39 as at 67. The housing member 61 has a closed end portion 68 which is substantially thickened to provide adequate strength for handling the longitudinal thrust of the rotary screw shaft 39 during actuation of the wing flap 12 to a position out of the plane of the main wing structure 10. The input shaft 39 is formed with a large annular shoulder 70 engaging thrust bearings 72 in turn engaging the end closure 68. Axial thrust of the input shaft 39 in the opposite direction, when the wing flap 12 is returned toward the plane of the main wing structure 10, is relatively small, and is taken by thrust bearings 73 engaging a shoulder 74 on the end closure 68. The thrust bearings 73 are retained in position by a suitable nut 75 on the end of shaft 39. If desired, an appropriate closure member may be provided as at 77.

As illustrated in FIGS. 3 and 4, the actuator outer sleeve 37 is formed with three angularly spaced helical grooves 50, and between the grooves 50, with three angularly spaced straight grooves 52. The helical grooves each receive a helically formed key 54 secured to the stationary bearing rings 20 and 21, while the straight grooves 52 each receive a cooperating straight key 56 which is integrally formed inside the pivoted output member 25, as will be understood on reference to the lower portion of the sectional view of FIG. 3. In order to appropriately secure the helical keys 54 to the bearing rings 20 and 21, opposite ends of the helical keys 54 include outwardly extending projections as at 80, at one end captured between the bearing ring 20 and the cover member 60, and at the opposite end captured between the bearing ring 21 and the cover member 61. Such arrangement serves to laterally space the bearing rings 20 and 21 properly as determined by the spacing between the projections 80.

In order to adequately handle the reaction of the key 54 against the bearing rings 20 and 21, each key or cam member 54 is formed with an outwardly extending key or projection as at 84, seated in a recess as at 85 provided in the interior of each bearing ring 20 and 21 at a position where the bearing member is internally thickened as at 86. The key or projection 84 extends in a direction which is inclined relative to a radius from the centerline of the device, in a manner such that the normal load on the device in the direction of arrow 88 has the effect of driving the key or cam member 54 into the rings 20 and 21, rather than tending to tip or turn the member 54 out of the bearing rings. The inclination of the outer surface of the cam member 54 and the cooperating groove 50, as at 90, aids in directing the normal load against the cam member 54 as described. At 86, where the bearing members 20 and 21 are extended inwardly to provide adequate seating for the cam member 54, the outer periphery of the actuator outer sleeve 37 may be appropriately reduced as shown at 92. If desired, the lateral inclined surfaces of the key members 54 and 56 may be covered with bearing material which facilitates longitudinal movement of the actuator, as indicated at 93 and 94. When the load is directed against the cam member 54 in the direction indicated by the arrow 88, the actuator acts against the keys 56 in the pivoted output member 25 in a direction indicated by the arrow 95.

In operation, it will be understood that rotary motion of the input screw shaft 39 has the effect of moving the actuator 35 longitudinally along the input shaft in a manner such that the helically arranged keys 54 on the stationary bearings 20 and 21 cause angular movement of the actuator which is transmitted through the straight keys 56 to the pivoted output member 25. When the input shaft 39 is rotated in a direction to move the flap 12 out of the plane of main wing structure 10, the axial thrust of the input shaft is greatest, and is taken by the relatively large bearings as at 72. Under these circumstances, the actuator 35 reacts against the stationary cams or keys 54 as indicated by the force arrow 88, and the actuator transmits pivotal motion to the output member 25 as indicated by the force arrow 95. When the input shaft 39 is reversed to return the flap 12 toward the plane of the wing 10, the forces on the flap aid in returning the flap, and the axial thrust of the input shaft is relatively light, and taken by the thrust bearing 73. Under these circumstances, the actuator 35 reacts against the relatively short surfaces on the keys 54 and 56, as at 97 and 98.

An important feature of the construction resides in the arrangement of the cam grooves on the actuator, as well as the cooperating keys, all at the same pitch radius about the axis of the actuator, in order to transmit heavy loads with minimum stresses. The keys on the housing and on the output member are coextensive in length in a compact arrangement. The grooves on the actuator are coextensive in length and about twice the length of the keys.

DETAILED DESCRIPTION OF THE EMBODIMENT OF FIGS. 5-9

Referring now to the embodiment of FIGS. 5-9, the power operable pivot joint includes two stages 105 and 106 which are similar in construction except for utilizing oppositely disposed actuators driven by oppositely threaded portions on a common input shaft. In view of the similar construction in the two stages, similar reference numbers are used to designate similar parts in two stages. Each stage includes a pair of stationary bearing rings as at 110 and 111 respectively having apertures as at 112 and 113 for stationarily mounting the bearing rings 110 and 111 on an aircraft wing structure. The bearing rings 110 and 111 are formed with annular internal bearing surfaces as at 115 adapted to receive external annular bearing projections 116 on an output member 118 for purposes of pivotally mounting the output member for movement on the bearing members 110 and 111. The output member 118 is appropriately formed with apertures as at 119 for attaching the output member to a wing flap. The bearing rings 110 and 111 are rigidly connected together by a plurality of angularly spaced helically shaped key or cam members 121, and the pivotal output member 118 is formed with a plurality of angularly spaced internally projecting integral straight key or cam members 123 parallel to the pivot axis.

Pivotal movement of the output member 118 on the stationary bearing rings 110 and 111 is produced by means of a longitudinally movable slider or actuator 128 including an internal annular member 130 and an outer sleeve 132. The outer sleeve 132 has helical grooves 133 receiving the helical key members 121, and straight grooves 134 receiving the straight key members 123. The inner tubular member 130 is secured to the outer sleeve 132 for rotation with the sleeve and for longitudinal movement with the sleeve, and the inner member is internally threaded for cooperation with one of oppositely threaded portions 136 (in stage 105) and 137 (in stage 106) on a rotary input shaft 138.

In order to secure the inner tubular member 130 to rotate with the outer sleeve 132, the inner member 130 is formed at the midportion with diametrically opposite outwardly extending projections 141 positioned in longitudinally extending inwardly opening grooves 142 in the outer sleeve 132. With such an arrangement, it will be understood that rotation of the inner member 130 causes rotation of the outer member 132.

In order to secure the inner member 130 to the outer member 132 so that the two move longitudinally together, the inner member 130 is rounded at opposite ends at 145 and the rounded ends carry bearing rings 146 and 147 having spherical seats on the rounded ends. The bearing ring 146 is seated against a shoulder 148 in the outer sleeve 132. The bearing ring 147 is engaged by a cup-shaped retainer 150 which is threaded into the outer sleeve 132, and abuts the bearing ring 147. At the outer end, the retainer 150 has an outwardly extending annular flange 152 which is formed with a toothed outer periphery engaged with a complementary toothed inner periphery on a lock plate 154 which is seated in the outer sleeve 132. The lock plate 154 includes outwardly extending lugs 155 secured to the outer sleeve 132 by means of screws 156. The arrangement is such that the outer sleeve 132 is constrained to rotate with the inner tubular member 130 and to move longitudinally with the inner member. However, the rounded ends 145 engaging the spherical seats in the bearing rings 146 and 147 enable pivotal movement of the outer sleeve relative to the inner member. Thus, in the event of flexing of the drive shaft relative to the housing, or flexing of the housing relative to the drive shaft, as will occur with flexing movement of the wing structure in a conventional manner, the members 130 and 132 are free to move pivotally relative to each other.

In order to secure the helical key members or cam members 121 against angular movement in the stationary annular bearing members 110 and 111, the members 121 are formed with outwardly projecting key portions as at 160 seated in a complementary recess in each bearing ring. Adjacent each key 160, there is an axially extending, radially outwardly projecting lug 162 at each end of each key member 121 receivable in a complementary recess in an adjacent housing member for locking the housing member against rotation relative to the stationary bearing rings.

At opposite ends of the entire apparatus, end housing members 164 are secured to the end bearing members 110. For this purpose, each housing member includes an outwardly extending annular flange 165 adapted to abut the end of a threaded extension 166 on the bearing member 110. The annular flange 165 is held against the threaded abutment 166 by a threaded locking ring 167 having an inwardly extending annular flange 168 engaging the flange 165 on the housing member. Each housing member 164 is formed with recesses as at 169 receiving the projections 162 on the keys 121, so that the housing member is held against rotation relative to the key 121 and the bearing member 110.

A centrally disposed housing member 172 extends between the bearing rings 111. In order to secure the housing member 172 against rotation, it is formed at opposite ends with recesses as at 174 receiving the locking lugs 162 at the ends of the key members 121. Adjacent each end, the housing member 172 is formed with an outwardly extending annular flange 176 adapted to abut the end of a threaded extension 177 on the bearing ring 111. In order to secure the flange 176 against the extension 177, a threaded locking ring 178 is utilized. The locking ring 178 includes an inwardly extending annular flange 179 for purposes of forcing the flange 176 against the extension 177. In order to permit placement of the locking ring 178 with the inwardly extending annular flange 179, on the housing member 172 past the outwardly extending annular flange 176, the flange 176 is formed with angularly spaced recesses as at 182, leaving intervening projections 183, and the locking flange 179 is formed with angularly spaced recesses 185 with intervening projections 186. It will be understood that the locking ring may be backed on to the housing member 172 past the flange 176 by inserting the projections 186 on the locking ring into the recesses 182 on the flange 176. After the projections 186 on the locking ring are moved past the projections 183, the locking ring may then be rotated to threadably secure the same on the projection 177 of the bearing ring 111. A split ring 188 is mounted on the housing member between the annular flange 176 and the locking flange 179 so that projections 186 do not lodge in recesses 182 during rotation of the locking ring. The split ring may be sprung open and slipped past the flange 176.

In the embodiment of FIGS. 5–9, as in the embodiment of FIGS. 1–4, the cam grooves 133 and 134, together with the key members 121 and 123, are all formed with the same pitch radius, at the outer surface of the actuator 128, so that the reaction occurs at the maximum diameter of the actuator and the stress is minimized while transmitting heavy loads. The keys 121 and 123 are coextensive in length, while the grooves 133 and 134 extend throughout the length of the actuator, which is approximately twice the length of the keys.

In operation, it will be understood that on rotation of the input shaft 138 in one direction, the actuators 128 may be moved in opposite directions on the shaft in a manner such that the actuators react against the stationary bearing rings 110 and 111 while acting against the pivoted output members 118 to cause pivotal movement of the latter. The output members are appropriately secured to wing flaps for purposes of pivoting the flaps relative to the main wing structure. When the flap is pivoted out of the plane of the main wing structure and the load is heaviest, the opposed axial thrust in the two stages 105 and 106 is taken in tension in the central housing member 172. When the input shaft is rotated in the opposite direction, the output members 118 are returned toward the original position, and the load on the device is relatively light.

In the construction illustrated in FIGS. 5–9, the actuator is formed with two angularly spaced helical grooves and two angularly spaced straight grooves, in contrast to the illustration in FIGS. 3 and 4 where there are three of each of the grooves. It will be understood that there are advantages in each arrangement, in that the use of two grooves simplifies the machining operations for the reason that contact between the grooves and the keys is assured where there are only two. Where three grooves and keys are used, the machining must be very precise in order to adequately spread the load among all of the keys, but the load on each key is thereby minimized.

DETAILED DESCRIPTION OF THE EMBODIMENT OF FIGS. 10–12

Referring now to the embodiment of FIGS. 10–12, a pair of opposed housing members 210 and 211 are formed with integral stationary annular bearing rings 212 and 213. The annular bearing ring 212 is formed with a shouldered annular bearing surface 215, and the annular bearing ring 213 is formed with a shouldered annular bearing surface 216. The bearing surfaces 215 and 216 receive complementary bearing surfaces on a pivoted annular output member 218 so that the latter is pivotally mounted on the stationary housing. As seen in FIG. 11, the stationary bearing member 212 is formed with outwardly extending projections including apertured ears as at 219 and 220, while the stationary bearing member 213 is similarly formed with apertured ears as at 221 and 222, so that the stationary members may be securely mounted on a main wing structure or the like. The pivotal output member 218 is preferably formed with a single projecting ear as at 224 having an appropriate aperture for connection of the output member with a pivoted link or the like for moving the link back and forth to adjust a wing flap or slat.

In order to obtain pivotal movement of the output member 218 on he stationary housing, a longitudinally movable actuator 230 is formed with a generally cylindrical outer surface having a pair of helical grooves as at 231 and a pair of straight grooves 232 parallel to the axis of the device. The helical grooves 31 receive stationary helical keys 235 which are angularly spaced in the stationary bearing ring 212 and integral with such bearing ring. The free end of each key member or cam member 235 is keyed to the stationary ring 213 at 236, so that the keys 235 are securely held against movement in the housing. The straight grooves 232 on the actuator 230 receive straight keys 238 which are angularly spaced and integrally formed in the pivoted output member 218.

The actuator 230 is in the form of a sleeve slidable longitudinally on a central hollow shaft 240. In order to move the actuator longitudinally back and forth on the shaft 240, opposite ends of the sleeve carry similar piston members 242, each formed with an extension 243 threadably secured in the end of the actuator 230. In order to facilitate angular movement of the actuator as it slides along the shaft, wear rings are preferably provided at 245 between the surfaces of the actuator and the shaft 240.

In order to provide expansible fluid chambers at opposite ends of the pistons 242, opposite ends of the housing members 210 and 211 are closed by heads 250 and 251 on the hollow shaft 240. The head 251 is integral with one end portion of the shaft 242, while the head 250 is separably formed and provided with an internally threaded portion 252 threadably secured on an end portion 253 on the shaft 240. It will be understood that the parts are assembled against the head 251 and around the shaft 240, and secured in position by tightening the head 250 on the shaft end 253.

Between the head 250 and the piston 242, there is a fluid-tight expansible chamber 255, and between the head 251 and the adjacent piston 242, there is an expansible fluid-tight chamber 256. In order to admit fluid under pressure to the chamber 255, the end 253 on the shaft 240 is formed with a longitudinal bore 258 and a radial port 259. In order to admit fluid under pressure to the chamber 256, the shaft 240 has a hollow inlet 260 and a radial port 262.

In operation, when fluid under pressure is admitted through the port 262 to the expansible chamber 256, the actuator 230 is pushed along the shaft 240 in a manner such that the helical key 235 causes rotation of the actuator, which in turn acts through the key 238 to pivot the output member 218. The hydraulically actuated device of FIGS. 10–12 has the advantage of considerable simplicity by virtue of the reduction in the number of parts and the ease of assembly in contrast to the screw actuated devices in FIGS. 1–4 and FIGS. 5–9. On the other hand, the screw actuated devices have the advantage of greater holding power.

As in the previous embodiments, the slider or actuator 230 is formed with the cam surfaces on the outer periphery at the greatest possible radius, and all the cam surfaces are formed at the same pitch radius, so that the loads are evenly distributed while minimizing stresses.

I claim:
1. A power operable pivot joint, comprising,
 a. support means,
 b. a member pivotally mounted on the support means for movement about a pivot axis,
 c. an actuator mounted for movement longitudinally of the pivot axis,
 d. cooperating cam means on the actuator and the support means providing for longitudinal movement of the actuator relative to the support means,
 e. cooperating cam means on the actuator and the pivoted member providing for longitudinal movement of the actuator relative to the pivoted member,
 f. one of said cam means being inclined relative to the pivot axis so that longitudinal movement of the actuator effects pivotal movement of the pivoted member,
 g. both of said cam means having the same pitch diameter about the pivot axis, and
 h. the cam means on the support means and the pivoted member being coextensive in length.

2. A power operable pivot joint as defined in claim 1, wherein both of the cam means on the actuator are coextensive in length.

3. A power operated pivot joint as defined in claim 1, including
 means on the support means defining expansible fluid chambers at opposite ends of the actuator for receiving fluid under pressure to move the actuator back and forth, and
 an outer surface on the actuator between the expansible chambers formed with cams cooperating with cams on the support means and pivoted member.

4. A power operated pivot joint as defined in claim 1, including a screw shaft rotatably mounted on the support means and extending through the actuator, an inner threaded bore in the actuator threadably connected with the screw shaft, and an outer surface on the actuator around the threaded bore formed with cams cooperating with cams on the support means and pivoted member.

5. A power operated pivot joint as defined in claim 1, wherein the first recited cam means is disposed helically relative to the pivot axis, and the last recited cam means is disposed parallel to the pivot axis.

6. A power operated pivot joint as defined in claim 1, wherein the actuator has a generally cylindrical outer surface and the first recited cam means includes a key on the support means and a cooperating groove in the outer surface of the actuator, and the last recited cam means includes a key on the pivoted member and a cooperating groove in the outer surface of the actuator.

7. A power operated pivot joint as defined in claim 1, wherein the support means comprises a pair of laterally spaced bearing rings rigidly secured together, means pivotally supporting the pivoted member on the bearing rings and outwardly projecting mounting arms on the bearing rings.

8. A power operable pivot joint comprising,
 a. a housing,
 b. means on the housing for stationarily mounting the housing,
 c. bearing means in the housing, d. a member pivotally mounted on the bearing means for movement about a pivot axis,
e. an actuator in the housing movable longitudinally of the pivot axis and having a generally cylindrical outer surface,
f. cooperating reaction means on the housing and the outer surface of the actuator providing for longitudinal movement of the actuator relative to the housing,
g. cooperating reaction means on the outer surface of the actuator and on the pivoted member providing for longitudinal movement of the actuator relative to the pivoted member,
h. one of said reaction means being inclined relative to the pivot axis so that longitudinal movement of the actuator effects pivotal movement of the pivoted member,
i. all of said reaction means on the actuator being coextensive in length, and
j. all of said reaction means having the same pitch radius about the pivot axis.

9. A power operable pivot joint as defined in claim 8, wherein the cooperating reaction means on the housing and actuator comprises angularly spaced cam means on the actuator engaging angularly spaced cam means on the housing, and the cooperating reaction means on the actuator and pivoted member comprises angularly spaced cam means on the actuator engaging angularly spaced cam means on the pivoted member.

10. A power operable pivot joint as defined in claim 9, wherein the cam means on the housing and the pivoted member are coextensive in length.

11. A power operable pivot joint as defined in claim 9, wherein the cam means on the actuator extend throughout the length of the actuator, and the actuator has a greater length than the cam means on the housing and the pivoted member.

12. A power operable pivot joint as defined in claim 11, including a screw shaft rotatable in the housing and having a threaded connection with the actuator for moving the latter longitudinally on rotation of the shaft.

13. A power operable pivot joint as defined in claim 11, including means in the housing defining expansible fluid chambers at opposite ends of the actuator for receiving fluid under pressure to move the actuator back and forth.

14. A power operable pivot joint as defined in claim 11, wherein the first recited cam means includes keys on the housing helically disposed relative to the pivot axis and cooperating grooves on the actuator, and the last recited cam means includes keys on the pivoted member parallel to the pivot axis and cooperating grooves on the actuator.

15. A power operable pivot joint, comprising,
a. a housing,
b. means on the housing for stationarily mounting the housing,
c. bearing means in the housing,
d. a member pivotally mounted on the bearing means for movement about a pivot axis,
e. an actuator in the housing movable longitudinally of the pivot axis,
f. a screw shaft rotatable in the housing and having a threaded connection with the actuator for moving the latter longitudinally on rotation of the shaft,
g. means in the housing for absorbing the axial thrust of the shaft,
h. cooperating reaction means on the housing and the actuator providing for longitudinal movement of the actuator relative to the housing,
i. cooperating reaction means on the actuator and the pivoted member providing for longitudinal movement of the actuator relative to the pivoted member,
j. one of said reaction means being inclined relative to the pivot axis so that longitudinal movement of the actuator effects pivotal movement of the pivoted member, and
k. all of said reaction means having the same pitch radius about the pivot axis.

16. A power operable pivot joint as defined in claim 15, including relatively large thrust bearings in the housing engaging a flange on the screw shaft for absorbing thrust in one direction, and relatively small thrust bearings in the housing engaging a flange on the screw shaft for absorbing thrust in the opposite direction.

17. A power operable pivot joint as defined in claim 15, wherein the actuator comprises an inner tubular member having an internally threaded bore threadably connected with the screw shaft, and an outer sleeve secured to the tubular member for longitudinal movement therewith and having reaction means formed on the outer surface thereof for cooperation with reaction means on the housing and pivoted member.

18. A power operable pivot joint as defined in claim 15, wherein the inner tubular member is mounted for pivotal movement relative to the outer sleeve to accommodate tilting of the housing relative to the screw shaft.

19. A power operable pivot joint as defined in claim 15, wherein the inner tubular member and the outer sleeve are connected together to prevent relative rotation.

20. A power operable pivot joint as defined in claim 15, wherein the housing comprises a pair of laterally spaced bearing rings rigidly secured together and pivotally mounting the pivoted member therebetween, and end covers secured respectively to the bearing rings and rotatably receiving opposite ends of the screw shaft.

21. A power operable pivot joint for mounting and actuating a trailing edge flap on an airplane wing, comprising,
a. a pair of laterally spaced bearing rings having outwardly projecting support arms adapted to be secured to an airplane wing,
b. an annular member pivotally mounted on the bearing rings for movement about a pivot axis and having an outwardly projecting arm adapted to be attached to a wing flap,
c. a plurality of angularly spaced keys disposed in the bearing rings and secured thereto,
d. a plurality of angularly spaced keys disposed in the pivoted member and secured thereto,
e. an actuator disposed in the bearing rings and pivoted member and having angularly spaced guide grooves respectively cooperating with said keys,
f. one of said plurality of keys and cooperating grooves being helical about the pivot axis so that axial movement of the actuator causes pivotal movement of the pivoted member, g. housing means secured to the bearing rings and enclosing the actuator, and h. means mounted in the housing means and connected for moving the actuator axially of the pivot axis.

22. A power operable pivot joint as defined in claim 21, including a screw shaft mounted in the housing means and threadably connected to the actuator for moving the latter axially on rotation of the shaft, and means in the housing for absorbing the axial thrust of the screw shaft.

23. A power operable pivot joint as defined in claim 21, including means in the housing defining expansible fluid chambers at opposite ends of the actuator, and means for admitting fluid under pressure selectively to the expansible chambers to move the actuator back and forth.

24. A power operable pivot joint as defined in claim 21, wherein all of the keys and guide grooves have a common pitch radius about the pivot axis.

25. A power operable pivot joint as defined in claim 21, wherein the guide grooves on the actuator are all coextensive in length, and the keys are all coextensive in length.

26. A power operable pivot joint, comprising,
a. a housing,
b. means on the housing for stationarily mounting the housing,
c. bearing means in the housing,
d. a pair of members pivotally mounted on the bearing means for movement about a common pivot axis,
e. a pair of actuators respectively associated with the pivoted members and movable longitudinally of the pivot axis,
f. a screw shaft rotatable in the housing and having oppositely threaded portions respectively connected with the actuators for moving the latter in opposite directions,
g. cooperating reaction means on the housing and the actuators providing for longitudinal movement of the actuators relative to the housing,
h. cooperating reaction means on the actuators and pivoted members providing for longitudinal movement of the actuators relative to the pivoted members, and
i. one of said reaction means associated with each actuator being inclined relative to the pivot axis so that longitudinal movement of the actuator effects pivotal movement of both pivoted members in the same direction.

27. A power operable pivot joint as defined in claim 26, wherein each actuator comprises an inner tubular member having an internally threaded bore threadably connected with the screw shaft, and an outer sleeve secured to the tubular member for longitudinal movement therewith and having reaction means formed on the outer surface thereof for cooperation with reaction means on the housing and associated pivoted member.

28. A power operable pivot joint as defined in claim 27, wherein each inner tubular member is mounted for pivotal movement relative to the associated outer sleeve to accommodate bending of the housing relative to the screw shaft.

29. A power operable pivot joint as defined in claim 27, wherein each tubular member and the associated outer sleeve are connected together to prevent relative rotation.

30. A power operable pivot joint as defined in claim 26, wherein the housing comprises a pair of laterally spaced bearing rings for mounting each pivoted member, means rigidly securing the rings of each pair together, end covers secured respectively to the outermost bearing rings and rotatably receiving opposite ends of the screw shaft, and a central cover secured to the innermost bearing rings.

31. A power operable pivot joint as defined in claim 26 wherein all of the reaction means have the same pitch radius about the pivot axis.

* * * * *